Patented June 4, 1940

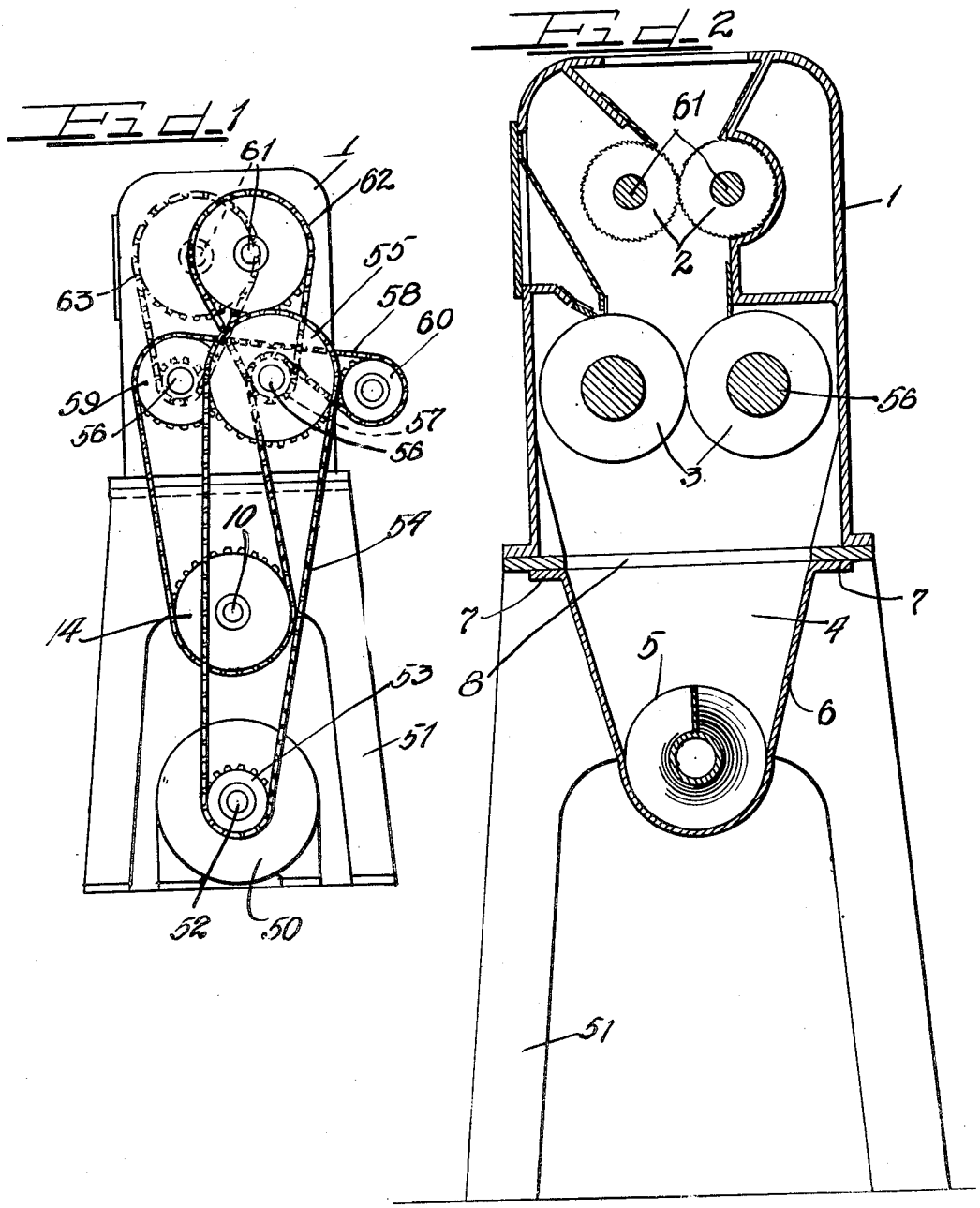

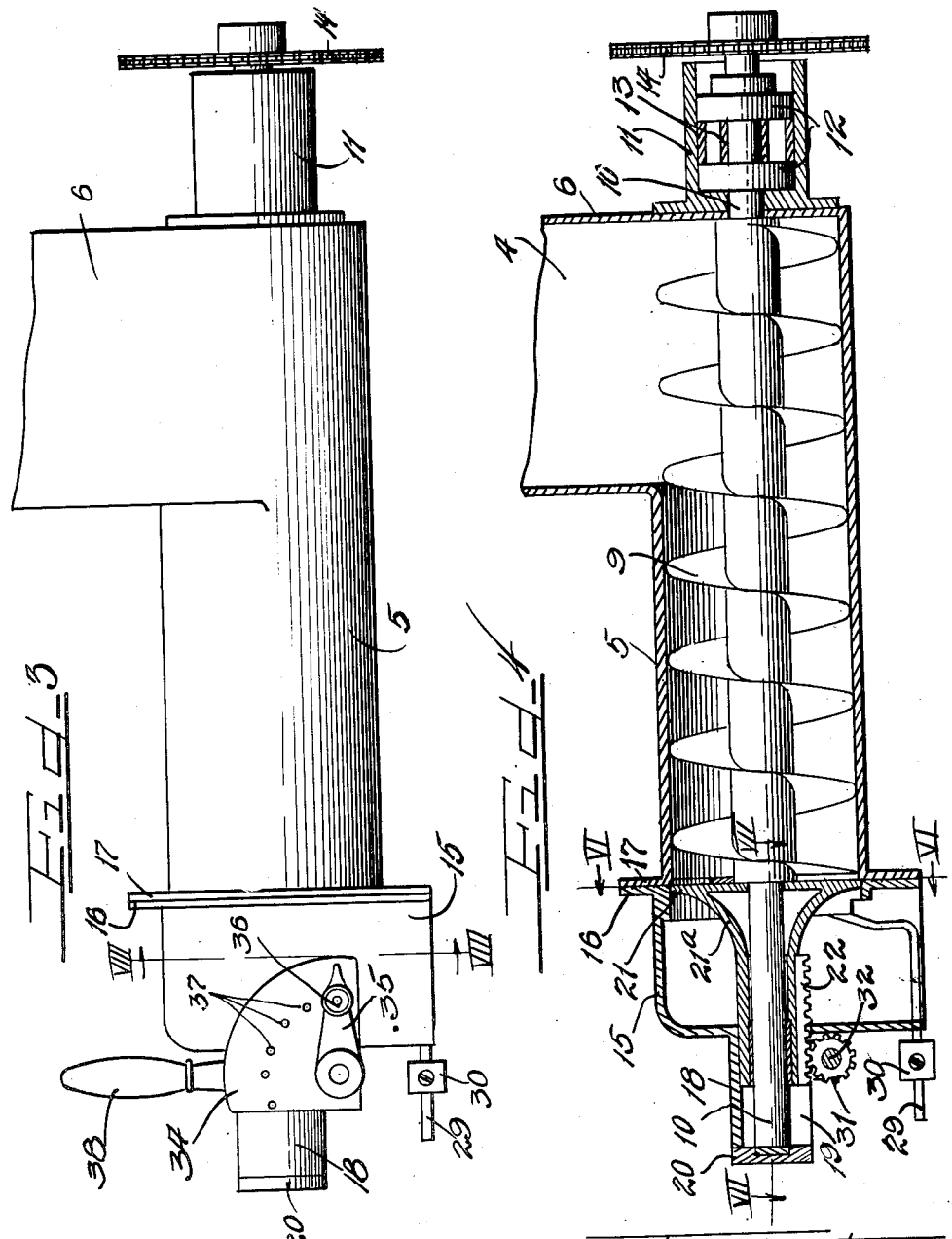

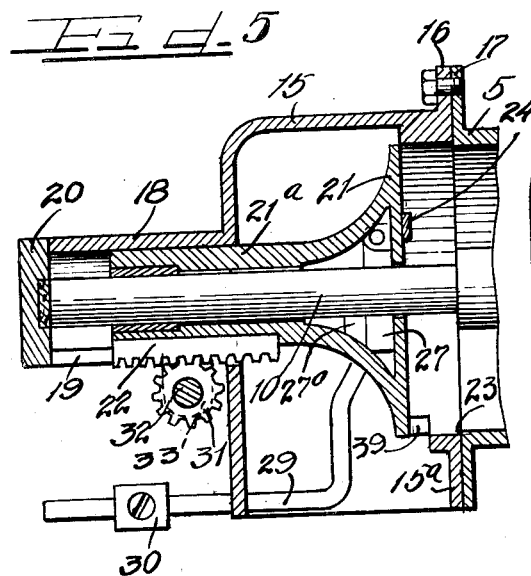
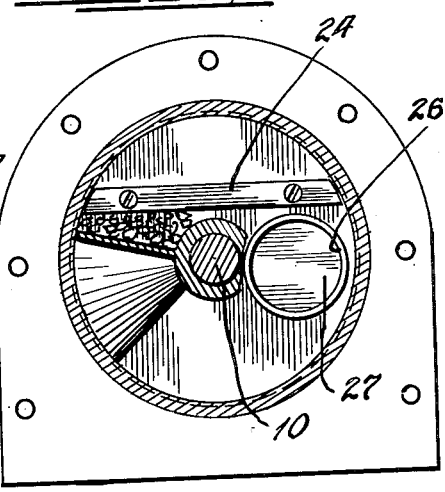
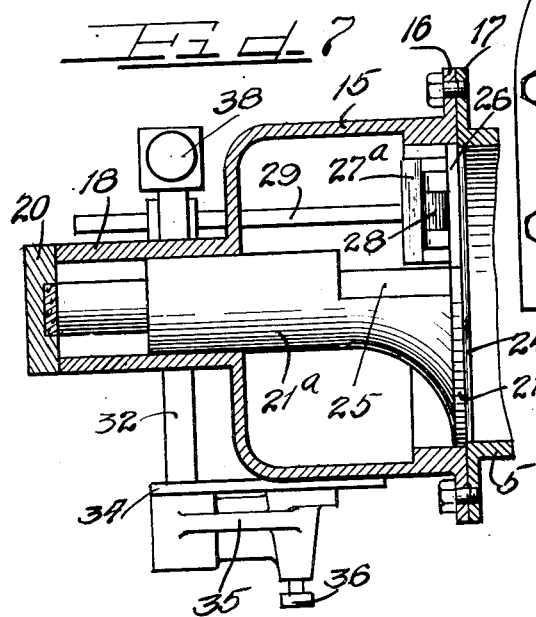
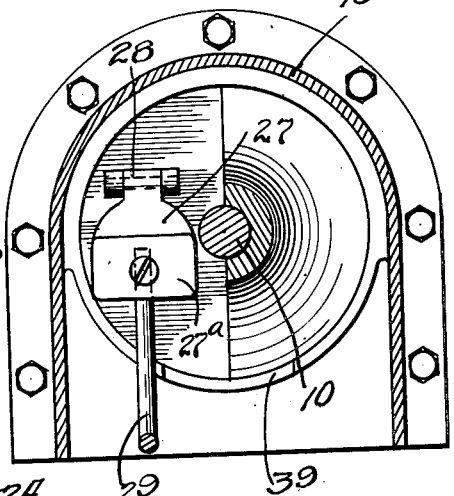

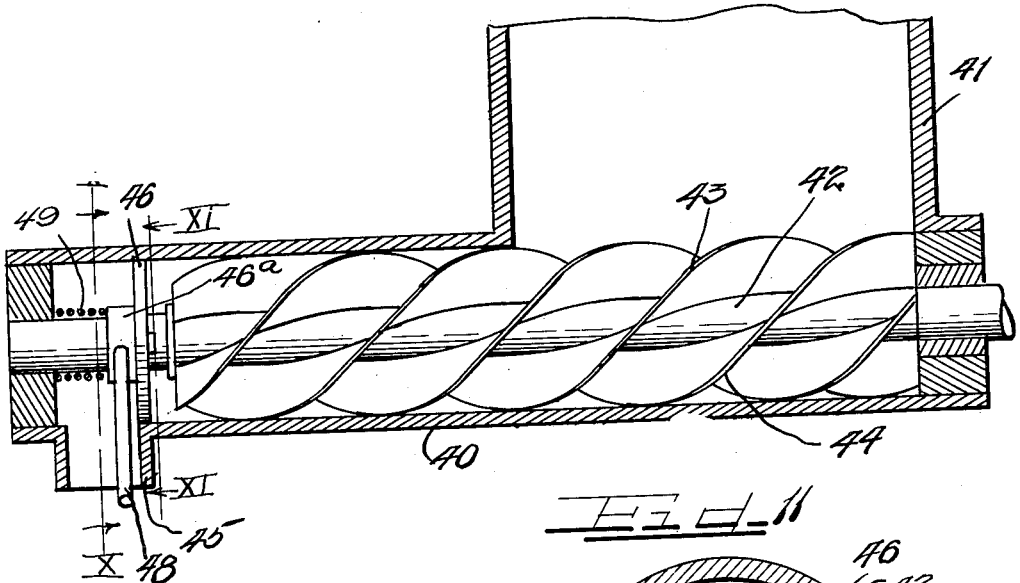
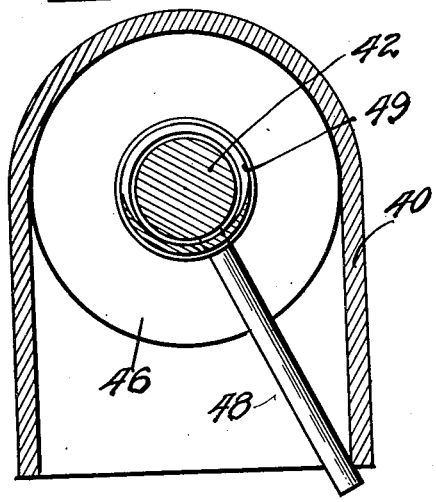
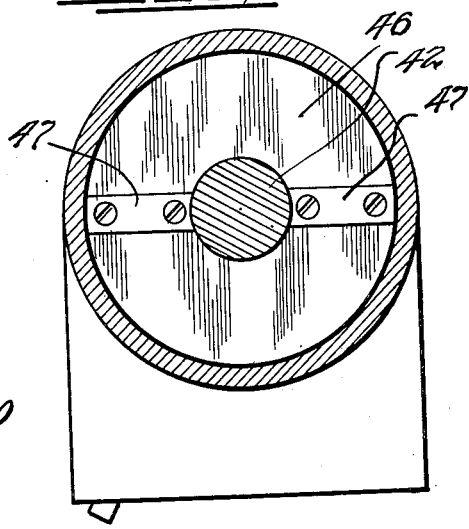

2,202,891

UNITED STATES PATENT OFFICE 2,202,891

APPARATUS FOR PREPARING GRANULAR COFFEE

Eugene G. Berry, Albert J. Hazle, Jr., and William M. Williams, Chicago, Ill., assignors to B. F. Gump Co., Chicago, Ill., a corporation of Illinois Application December 30, 1937, Serial No. 182,412

3 Claims. (Cl. 83—18)

This invention relates to an improved apparatus for preparing ground coffee.

In the grinding or granulating of coffee, plate or attrition mills have been generally used for producing the fine grinds like powdered coffee. These mills are not suitable for making coarse grinds. The coarse grinds were generally produced upon roller mills embodying corrugated rolls. The coffee produced upon the roller mills is commonly known as steel cut coffee.

In the production of fine grinds upon a plate mill, excessive heat is generated that results in the loss of flavor, aroma, and lasting qualities. Many coffee roasters became dissatisfied with the use of these plate mills and sought better equipment for producing the fine grinds.

In the production of steel cut coffee upon a roller mill, large flakes of chaff are liberated from the coffee beans. In order to comminute this chaff and render it substantially invisible in the finished product, the mass of coffee with its comingled chaff is worked or agitated. As steel cut coffee consists of uniform particles that cause an abrasive action for reducing the chaff, the heat that was generated during the working or agitation was not of an objectionable character. The working or agitation of the fine grinds to comminute and conceal the chaff would produce objectionable heat.

One problem that confronted the inventors in overcoming the objections to plate or attrition mills consisted in devising grinding equipment that would produce the fine grinds without excessive heating of the product and the resulting loss of flavor, aroma and lasting qualities. A way was discovered of finely corrugating rolls to produce the fine grinds in a very satisfactory manner, thus eliminating the use of plate or attrition mills.

Another problem that confronted the inventors consisted in discovering means by which the chaff in these fine grinds could be reduced and concealed in the finished product without the generation of excessive heat, for it was discovered that the working or agitation of these fine grinds to accomplish the purpose sought would generate objectionable heat in the finished product.

It is an object of this invention to produce the fine grinds of coffee without excessively heating the same with the resulting loss of flavor, aroma and lasting qualities, and to comminute and conceal the chaff without objectionably heating the final product.

While the apparatus is primarily designed for making the fine grinds, the same is susceptible of use in making also coarse grinds.

To obtain the desired result, the finely reduced coffee product with its comingled chaff is continuously conveyed in a predetermined path without any material working or agitation, the forward movement of the material is partially obstructed to obtain an accumulation, a part of this accumulation is restrained from rotation while the adjacent part of the accumulation is rotated, whereby the relatively movable parts will exercise an efficient rubbing action between the coffee particles that will comminute the chaff and blend the same with the finished product so that it is substantially invisible.

The invention comprises the novel structure and combination of parts hereinafter described and more particularly pointed out and defined in the appended claims.

In the accompanying drawings which illustrate a preferred form of the invention and in which similar reference numerals refer to similar features in the different views:

Fig. 1 is an elevational view of an apparatus involving this invention.

Fig. 2 is an enlarged sectional view of the apparatus taken transversely through the apparatus.

Fig. 3 is an enlarged elevational view of the chaff comminuting cylinder.

Fig. 4 is an enlarged sectional view through the cylinder.

Fig. 5 is an enlarged fragmentary sectional view of one end of the chaff comminuting cylinder.

Fig. 6 is an enlarged sectional view taken substantially upon the line VI—VI of Fig. 4 looking in the direction of the arrows.

Fig. 7 is an enlarged sectional view taken substantially upon the line VII—VII of Fig. 4 looking in the direction of the arrows with parts in elevation.

Fig. 8 is an enlarged sectional view taken substantially upon the line VIII—VIII of Fig. 3 looking in the direction of the arrows with parts in elevation.

Fig. 9 is an enlarged sectional view of a modified form of the chaff comminuting cylinder.

Fig. 10 is an enlarged sectional view taken substantially upon the line X—X of Fig. 9.

Fig. 11 is an enlarged sectional view taken upon the line XI—XI of Fig. 9.

In order to illustrate this invention, there is shown a coffee mill comprising a casing 1 in which a pair of reduction rolls 2 are journalled and beneath these reduction rolls are the finishing rolls 3 that reduce the coffee to finished size. These rolls are finely corrugated to produce the desired fineness of grind. The reduced coffee descends from the final reduction rolls through a passage 4 which leads to a chaff comminuting cylinder 5. It will be noted that the cylinder 5 has a vertically extending guide chute 6 provided with flanges 7 attached to the bottom of the casing 1. This chute forms the passage 4 through which the ground coffee and its commingled chaff descend into the cylinder 5. The bottom of the casing is open in the region of the chute 6 as indicated at 8 for the passage of the ground coffee from the grinding chamber.

A spiral conveyor 9 extends longitudinally through the cylinder 5. The rear end of the shaft 10 that carries the spiral conveyor extends through the rear end of the cylinder and through a small cylindrical housing 11 in which are located a pair of ball bearing rings 12 in which the rear end of the shaft is journalled as is well known in the art. These bearing rings are spaced apart by the sleeve spacer 13. Upon the rear end of the shaft 10 which extends beyond the housing 11, there is a driven sprocket 14 for rotating the shaft 10.

Upon the forward end of the cylinder 5, there is a housing 15 which is open at its lower end as shown in Fig. 8 and that constitutes a part of the cylinder.

The housing 15 is provided with an arcuate flange 16 secured to the flange 17 on the front end of the cylinder. The housing 15 is provided with a centrally forwardly extending cylindrical bearing barrel 18 provided with a slot 19 at its lower portion for a purpose to be later set forth. The shaft 10 that carries the spiral extends thru the housing 15 and into the bearing 18 and abuts a thrust ring 20 that forms the end of the housing 18.

Upon the forward end of the shaft 10, there is mounted a disk 21 provided with an elongated hub 21a that surrounds the shaft 10. The lower portion of this hub carries a rack bar 22 that extends into the slot 19. The disk 21 has a circumference that fits the interior wall of the housing 15 which it will be noted has a cylindrical portion 15a adjacent the cylinder that is of slightly larger diameter than the diameter of the cylinder 5 so that an annular shoulder 23 is formed for engagement by the disk 21 when the same is in its operative position. Upon the inner face of the disk 21 there is secured a transversely extending slat or strip 24 the purpose of which will later appear.

It will be noted that the hub 21a of the disk 21 slopes or flares and joins the disk 21 adjacent the outer periphery. This flaring portion of the hub is cut away upon one side as indicated at 25 (Fig. 7). An opening 26 is formed in the disk 21 in the region of this cut-away portion and over this opening there is suspended a door 27 (Fig. 8) which is hinged to the disk as indicated at 28 just above the opening. The lower portion 27a of this door is preferably made thicker and heavier than the upper portion thereof for tending to cause the door to swing toward closed position. From the thicker portion 27a of the door, there extends an angular rod 29 that extends downwardly and then substantially horizontally. An adjustable weight 30 is secured upon the horizontal portion of the rod and increases the tendency of the door to move towards closed position. The adjustment of the weight will vary this tendency, as is obvious.

The disk 21 is slidably mounted upon the shaft 10 primarily for the purpose of drawing the same outwardly for cleaning out the cylinder at the end of a run. To this end, there is provided a gear 31 that meshes with the rack bar 22. This gear 31 is secured upon a shaft 32 that is journaled in a bearing 33 on the housing portion 15 as shown in dotted lines in Fig. 5. One end of the shaft 32 extends thru a segmental shaped plate 34 which is attached to the housing 15. An arm 35 is secured to the end of the shaft 32 adjacent the outer face of said plate. The arm 35 carries an adjustable pin or peg 36 adapted for engaging apertures 37 in said plate. The other end of said shaft 32 is provided with an operating handle 38 for rotating or rocking said shaft.

It will be evident that the pin 36 may be withdrawn and the shaft 32 rocked by the handle 38 for causing the gear 31 to engage the rack bar 22 for moving the disk 21 outwardly and inwardly. This disk can be held in its adjusted position by the pin 36 engaging in an aperture 37. When the disk is withdrawn outwardly to a sufficient extent, any material in the cylinder can escape between the disk and the edge of the flange 15a for cleaning out purposes. The lower portion of the flange 15a is, however, preferably cut away as indicated at 39 to form a slot for cleaning out purposes. With the use of the slot 39, it is not necessary to withdraw the disk 21 beyond the confines of the flange 15a for cleaning out purposes, as the coffee remaining in the cylinder will escape thru slot 39 as soon as the disk 21 is withdrawn to cause the slot to communicate with the interior of the cylinder as shown in Fig. 5.

In normal operation the disk 21 is designed to be located in the position shown in Fig. 4, in substantial abutting relation with end of the spiral sleeve on shaft 10. In this position, it is spaced slightly from the end of the spiral blade constituting the conveyor. As the coffee is conveyed against the inner face of the disk 1, it will be put under pressure by the conveying action. The strip or rib 24 will prevent the coffee from rotating against the inner face of the disk notwithstanding the action of the conveyor, but that coffee which is spaced sufficiently inwardly from the disk 21 will rotate and cause a rubbing action with respect to the coffee against the inner face of the disk 21 for reducing the chaff.

In Figs. 9 to 11, a slightly modified form of a chaff comminuting cylinder 40 is shown that is primarily designed for a machine adapted for use in a store for grinding small lots of coffee. The cylinder 40 is adapted for attachment to the grinding chamber as illustrated in connection with the first form. To this end it is provided with an upwardly directed chute 41 for receiving the granulated coffee and its comingled chaff from the grinding chamber.

A shaft 42 is suitably journalled in the ends of the cylinder and carries a double spiral 43 and 44 for conveying the material at a rapid rate toward the discharge end of the cylinder. Adjacent the discharge end of the cylinder, there is provided a discharge chute 45 leading from the bottom of the cylinder. A disk 46 is slidably mounted upon the shaft 42 adjacent the discharge chute. Upon its inner surface, this disk is provided with one or more slats or strips 47 which may be removably secured by suitable screws, as shown. In the present instance, a strip 47 is secured upon the disk upon each side of the shaft as shown in Fig. 11.

The disk 46 is provided with a hub 46a from which extends an arm or rod 48. The arm 48 extends into the discharge chute and is adapted for engaging the wall thereof as shown in Fig. 10 for preventing rotation of the disk.

The disk 46 is normally spring pressed to a position inwardly of the discharge chute by a coil spring 49 located between the end of the casing and the end of the hub 46a.

In operation, the material is conveyed at a suitable rate of speed in the cylinder against the inner face of the disk 46 where it will accumulate. This conveying action will cause the material to be put under pressure against the disk. The strips 47 will stop the rotary movement of the material against the disk with the result that a rotation will be set up in the adjacent material and this rotation of the adjacent material with respect to that held against rotation will exercise a rubbing action between the particles of coffee that will comminute and conceal the chaff. Sufficient pressure against the disk 46 will cause the same to slide outwardly against the spring 49 to allow the coffee to escape through the discharge chute 45.

The apparatus described is adapted to be operated by a motor 50 (Fig. 1) that may be suitably supported in the lower part of the pedestal 51 of the machine. The shaft 52 of the motor rigidly carries a sprocket gear 53 over which a sprocket chain 54 is trained. The sprocket chain 54 is trained over a sprocket 55 on one of the shafts 56 that carries one of the finishing rolls 3.

The shaft 56 also carries a small sprocket gear 57. A sprocket chain 58 is trained over the sprocket gear 57, around the sprocket gear 14 on the shaft 10 and then around a sprocket gear 59 on the other roll shaft 56. From the sprocket gear 59, the sprocket chain 58 is trained over an idler sprocket gear 60 before it returns to sprocket gear 57.

The shafts 56 are respectively connected with the shafts 61 that carry the first reduction rolls 2 by means of the sprocket gearing 62 and 63. Thus the different parts are operated from the same source of power.

In the operation of the apparatus herein described, the ground coffee and its comingled chaff as produced by the reduction rolls descends into the comminuting cylinder where it is fed forward at a suitable rate against the forward end where it accumulates.

In the event that the first form of comminuting cylinder is used, the spiral conveyor 9 will feed the coffee and its comingled chaff forwardly at a suitable rate of speed with the result that the coffee will accumulate and be put under pressure against the disk 21 which is held against rotation in its mounting. As the coffee accumulates under pressure against disk 21, it will be prevented from rotating to a depth equal to the depth of the strip 24. However, a rotation will be set up in the coffee inwardly of and adjacent the strip 24 by the conveyor and this adjacent rotating portion will move relatively to that held against rotation adjacent the inner face of the disk 21 with the result that a rubbing action will be exercised between the relatively moving parts of the coffee that will comminute the chaff and render the same substantially invisible. The pressure of the coffee mass against the yielding gate or door 27 will cause the same to swing outwardly a sufficient extent for the discharge of the coffee. This gate will also prevent the currents of air created by the spiral conveyor from blowing the chaff through the discharge opening before it is comminuted.

In the modified form of cylinder, the operation of reducing the chaff is substantially similar to the preferred form, and the pressure against the disk 46 will cause the same to slide outwardly against the action of the spring 49 until a part of the discharge opening is uncovered for the discharge of the material. It should be noted that the upper half of the circumference of the disk 46 fits against the casing and that the material is designed to be discharged under the lower part of the periphery when the disk moves outwardly to uncover a part of the discharge opening.

It will be appreciated that in the described apparatus the coffee and its comingled chaff are conveyed at a suitable speed without any material working or agitation to generate heat in the mass, and that the coffee is given an effective rubbing action adjacent the discharge end which creates very little heat and as the coffee is shortly discharged after such rubbing action, whatever heat that might have been generated will not be transmitted to any extent to the advancing mass in the cylinder.

It will be further appreciated that the apparatus is exceedingly simple and not likely to get out of order. Besides, it occupies very little space. Further, it is possible to thoroughly clean the machine after a run by moving the disk 21 outwardly a sufficient distance to allow the action of the spiral conveyor to sweep out any remaining coffee through the slot 39. Thus the cylinder can be always cleaned and no stale coffee will remain to become mixed with the coffee produced during the next grinding operation. It will also prevent the blend of coffee in one grind from being mixed with a different blend of coffee in the next grind.

We are aware that many changes may be made and numerous details of construction may be varied through a wide range without departing from the principles of this invention, and we, therefore, do not purpose limiting the patent granted hereon otherwise than is necessitated by the scope and spirit of the appended claims.

We claim as our invention:

1. In a coffee mill in which the coffee beans are ground and the chaff thereof is liberated, means for treating the ground coffee and its commingled chaff for reducing and concealing the chaff, comprising an elongated cylinder, a spiral conveyor having a shaft extending lengthwise in said cylinder adapted for advancing the coffee and its commingled chaff to the forward end of said cylinder, a non-rotatable disk slidably mounted upon said shaft and closing the forward end of said cylinder, a rib upon the inner face of said disk spaced from the associated end of the conveyor for preventing rotary movement of the material adjacent thereto, but enabling passage of coffee granules between it and the conveyor without crushing the same, said disk having a discharge outlet, a yieldably supported gate for closing said outlet, and manually operable means for withdrawing said disk for cleaning out any remaining coffee mass.

2. In a coffee mill in which the coffee beans are ground and the chaff liberated, means for reducing and concealing the chaff in the ground coffee comprising an elongated cylinder, a shaft journaled lengthwise in said cylinder, a spiral conveyor on said shaft for advancing the material to the forward end of said cylinder, a disk slidably mounted upon said shaft for closing the forward end of said cylinder, a rib on the inner face of said disk for preventing the material adjacent thereto from rotating, said disk having a discharge opening, a yielding gate for restricting said opening, said cylinder having a clean-out passage in its bottom adjacent its forward end and outwardly of said disk when said disk is in its normal position, and means for withdrawing and latchingly securing said disk outwardly beyond said passage.

3. In apparatus of the character described, an elongate coffee treating cylinder, a shaft extending axially of the cylinder, conveyor means carried by said shaft for advancing material being treated to the forward end of the cylinder, a housing at the forward end of the cylinder having a shaft-supporting bearing and a cylindrical portion of slightly larger diameter than said first cylinder forming an end extension thereof, said first cylinder and cylindrical portion defining an abutment shoulder at their jointure, a disk mounted for axial movements and having its periphery in sliding engagement with the interior wall of said cylindrical portion and arranged to be moved into and out of engagement with said abutment shoulder, and a cut-out portion at the bottom of said cylindrical portion disposed outwardly of said disk, when the disk is against the abutment shoulder.

EUGENE G. BERRY.
ALBERT J. HAZLE, Jr.
WILLIAM M. WILLIAMS.